United States Patent
Hsieh et al.

[11] Patent Number: 6,005,688
[45] Date of Patent: Dec. 21, 1999

[54] BATCH SCANNING METHOD FOR AN IMAGE INPUT SYSTEM

[75] Inventors: Ming-Mu Hsieh; Shi-Zheng Kuo; Wei-Jen Huang, all of Hsinchu, Taiwan

[73] Assignee: Umax Data Systems, Inc., Hsinchu, Taiwan

[21] Appl. No.: 09/103,464

[22] Filed: Jun. 23, 1998

Related U.S. Application Data

[63] Continuation-in-part of application No. 08/649,307, May 17, 1996, abandoned.

[51] Int. Cl.⁶ ..................................................... H04N 1/46
[52] U.S. Cl. ............................................. 358/504; 358/406
[58] Field of Search .................................... 358/406, 504, 358/488, 474, 494, 497, 453, 448, 496, 498, 451, 540, 487, 450; 382/318, 319, 173, 348, 180, 176; 348/98; 399/183, 205

[56] References Cited

U.S. PATENT DOCUMENTS

| | | | |
|---|---|---|---|
| 4,021,777 | 5/1977 | Shepard | 382/317 |
| 4,404,597 | 9/1983 | Stoffel | 358/494 |
| 4,546,385 | 10/1985 | Anastassiou | 358/426 |
| 5,172,422 | 12/1992 | Tan | 358/488 |
| 5,369,716 | 11/1994 | Sangu | 382/317 |
| 5,440,403 | 8/1995 | Hashimoto et al. | 358/444 |
| 5,546,474 | 8/1996 | Zuniga | 382/176 |

*Primary Examiner*—Kimberly A. Williams
*Attorney, Agent, or Firm*—Merchant & Gould P.C.

[57] ABSTRACT

A batch scanning method for an image input system includes sorting a plurality of image areas according to top positions of said image areas. A calibration mode is set. Next, top, bottom, left and right positions of the present image area, and the top position of the next higher image area are set to some registers. Thereafter, the image input system is calibrated when the present image area is the highest image area of the sorted areas. Then, the present image area is scanned. Afterward, a light source and a photodetector are moved to the top position of said next higher image area when at least one image area has not been scanned. The position setting step, the scanning step and the moving step are repeated until the lowest image area has been scanned.

21 Claims, 8 Drawing Sheets

BATCH SCANNING METHOD FOR AN IMAGE INPUT SYSTEM

This is a Continuation-In-Part of U.S. application Ser. No. 08/649,307, filed May 17,1996, now abandoned.

BACKGROUND OF THE INVENTION

1. Field of the Invention

The present invention relates to a scanning method for an image input system, and more particularly to a batch scanning method for an image scanner.

2. Description of the Prior Art

An image input device, like an image scanner, becomes a convenient and necessary tool in our everyday life. The scanner turns more powerful as central processing unit gets faster and memory device has more capacity. However, there exists a bottleneck in connection with time waste as a step motor drives the lamp and the charge-coupled device (CCD) back and forth when scanning multiple image sub-areas. Furthermore, while the lamp and the CCD are moving to home position after scanning any image subarea, tedious and time-consuming calibration step usually has to be performed.

FIG. 1 shows the flow diagram of a traditional method, typically called single scanning method. Initially in step 11, a color mode, a gray mode or a lineart (or called bi-level black-and-white) mode is chosen according to the attribute of an image area.

Then a calibration is performed to compensate the photo response non-uniformity of the light source, the charge-coupled device and the lens of the scanner. Thereafter, the image area is scanned (step 12), and then the lamp and the charge-coupled device are driven (in step 13) to home position, i.e., the topmost position of the whole image to be scanned, accomplishing a single scan cycle (step 14).

FIG. 2A shows the flow diagram of another conventional method, typically called multiple scanning method. FIG. 2B shows an example of scanning three image sub-areas designated as job 1, job 2, and job 3. Before processing job 1, first calibration task, step 201, is performed wherein color mode, gray mode or lineart (or bi-level black-and-white) mode is chosen according to the attribute of this sub-area or according to a received command from a user. The lamp and the CCD are driven from home position 20 to the top position 22 of the job 1, and are then driven to home position 20, step 203, after scanning, step 202, job 1's area. Next, second calibration, step 201, is practiced and job 2's area is scanned in the same manner as job 1. While there is still another job to be processed, the "YES" branch is selected in step 204, and the calibration step 201, scanning step 202 and the moving of the lamp and the CCD in step 203 are repeated. On the other hand, end of scanning is reached, step 205.

There are some disadvantages associated with the conventional method described above: (1) the repeated calibration steps for an image sub-area take a lot of time and will reduce the performance of the scanner; (2) the moving back and forth of the lamp and the CCD is time-consuming due to its mechanical driving source, for example a step motor.

According to the aforementioned drawbacks, a software method for processing multiple image areas has been devised. This software scanning method works in a way similar to the flow of FIG. 1. However, the whole image which includes all image sub-areas are scanned at once, and are then stored in memory. Thereafter, a software method is used to pick out every sub-area. The most disadvantage for this method is its use of memory more than two times the memory of any other conventional method.

SUMMARY OF THE INVENTION

The present invention provides a batch scanning method for an image scanner to process multiple image sub-areas. The present invention also save time and memory space so as to increase the performance for inputting multiple image areas in one pass of processing. The present invention includes sorting a plurality of image areas according to top positions of said image areas. A calibration mode is set. Next, top, bottom, left and right positions of the present image area, and the top position of the next higher image area are set to some registers. Thereafter, the image input system is calibrated when the present image area is the highest image area of the sorted areas. Then, the present image area is scanned. Afterward, a light source and a photodetector are moved to the top position of said next higher image area when at least one image area has not been scanned. The position setting step, the scanning step and the moving step are repeated until the lowest image area has been scanned.

DESCRIPTION OF THE PREFERRED EMBODIMENT

Figure 3A:
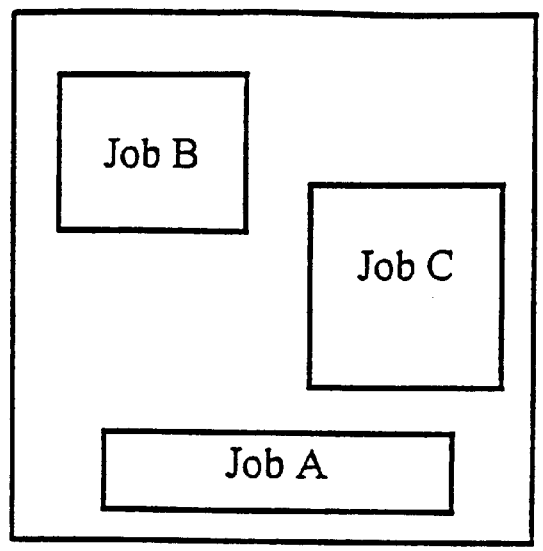
FIG. 3A shows an example of scanning three image sub-areas before performing job sorting in the present invention.
Figure 3B:
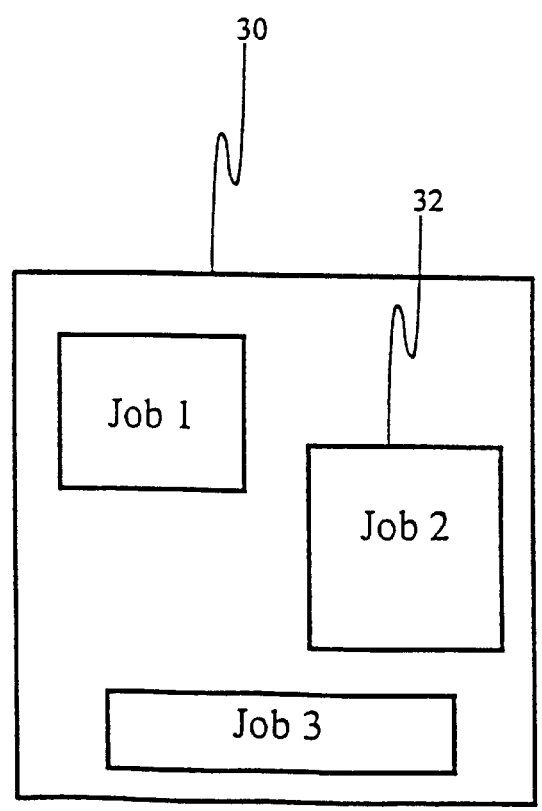
FIG. 3B shows the example of scanning three image sub-areas after performing the job sorting in the present invention.
Figure 4:
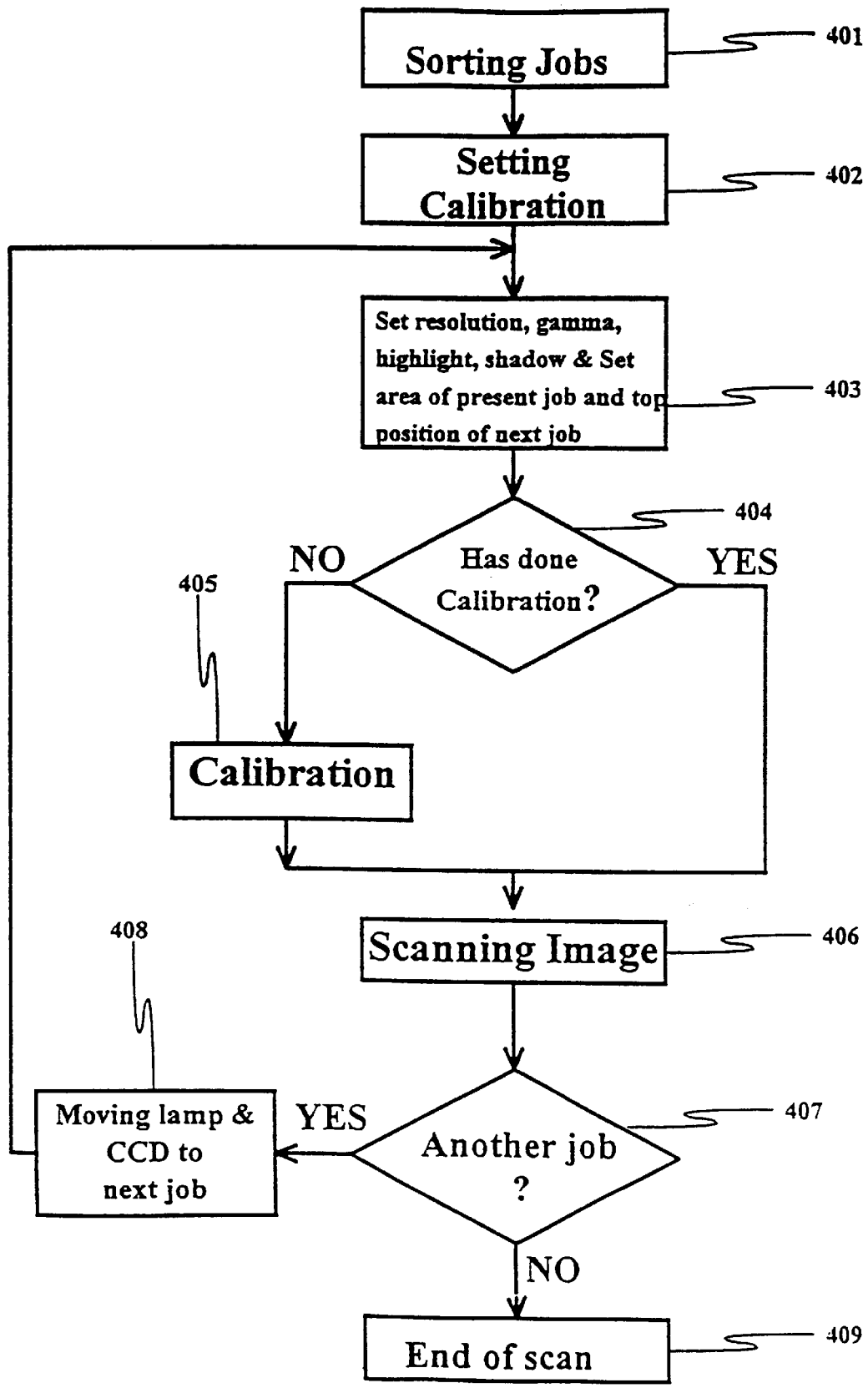
FIG. 4 illustrates the flow of the present invention.

FIG. 3A shows an example of scanning three image sub-areas designated as job A, job B and job C. Referring also to FIG. 4 of the present invention, all jobs in FIG. 3A are sorted in step 401 by, for example, a conventional quick sorting method, according to the top positions of the job A, the job B and the job C. FIG. 3B shows the arrangement of the jobs after sorting in ascending order according to every job's top position.

It is observed that, while in scanning, a moving array of photosensors (not shown) may overlap some of the jobs (for example, job 1 and job 2) simultaneously.

Next, the calibration mode of the scanner is set, step 402, as a color mode, a gray mode or a lineart (or bi-level black and white) mode. Among these mode, the color mode has highest priority, while the lineart mode has lowest priority. Therefore, if at least one color mode is required, the whole process will be set as color mode in preventing any job from feature loss. However, if there is no color mode, but at least a gray mode, then gray mode is chosen. Still, if all jobs have lineart mode, the lineart mode is asserted so as to speed up the image processing and save memory space.

Thereafter, other setting such as resolution, gamma, highlight or shadow are performed in step 403. Further, the top, bottom, left and right positions of the present job and the top position of a next higher job are set to some registers in the scanner. Next, step 404 is performed to determine whether the scanner has been calibrated. For the job 1 in FIG. 3B, the "NO" branch is selected. Therefore, the scanner is subject to calibration, step 405, for compensating the photo response non-uniformity of the light source, the charge-coupled device and the lens of the scanner.

Afterward, job 1 in FIG. 3B is scanned in step 406. If there is still another job to be processed, the "YES" branch is selected in step 407. The light source, for example a lamp, and the photodetector, for example a charge-coupled device (CCD) or an array of CCDs, are moved, step 408, to the next job's top position, which is previously set to the scanner's register in step 403. Due to the direct movement from the present job to the top position of a next higher job, more time is saved compared to the movement from the present job to the home position 30 (FIG. 3B) and then to the top position of a next higher job in a conventional way.

For those jobs rather than the job 1, the calibration step 405 is no longer required, resulting in a faster image processing. The steps 403, 404, 406, 407 and 408 are repeated until the last job is reached, leading to the end of scanning, step 409, wherein the lamp and the CCD are moved to home position.

In light of the disclosure, the disclosed batch scanning method is arranged in a manner so that the photodetector moves backwards and directly (without going back to the home position) to the top position of the next higher image area (job 2 in this case) when the top position of the next higher image area is located higher than the bottom position of the present image area (job 1 in this case); and the photodetector moves forwards and directly (without going back to the home position) to the top position of the next higher image area (job 3 in this case) when the top position of the next higher image area is located lower than the bottom position of the present image area (job 2 in this case).

Figure 5A:
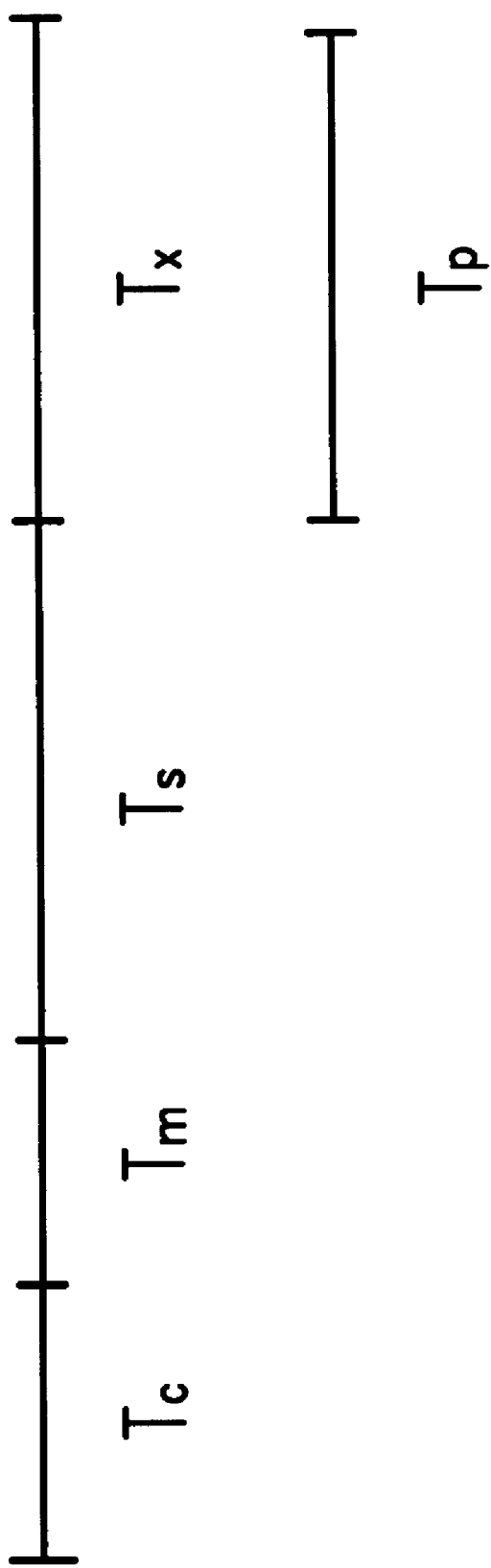
FIG. 5A shows a timing diagram for the conventional single scanning method.
Figure 5B:
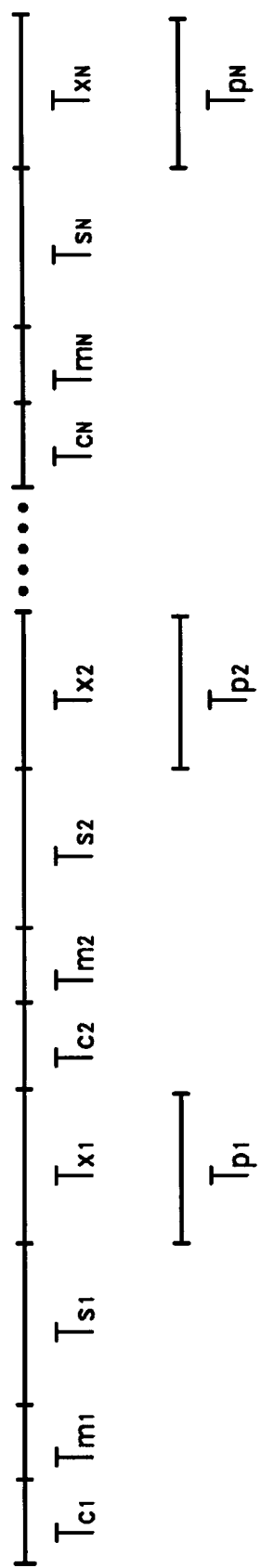
FIG. 5B shows a timing diagram for the conventional multiple scanning method.
Figure 5C:
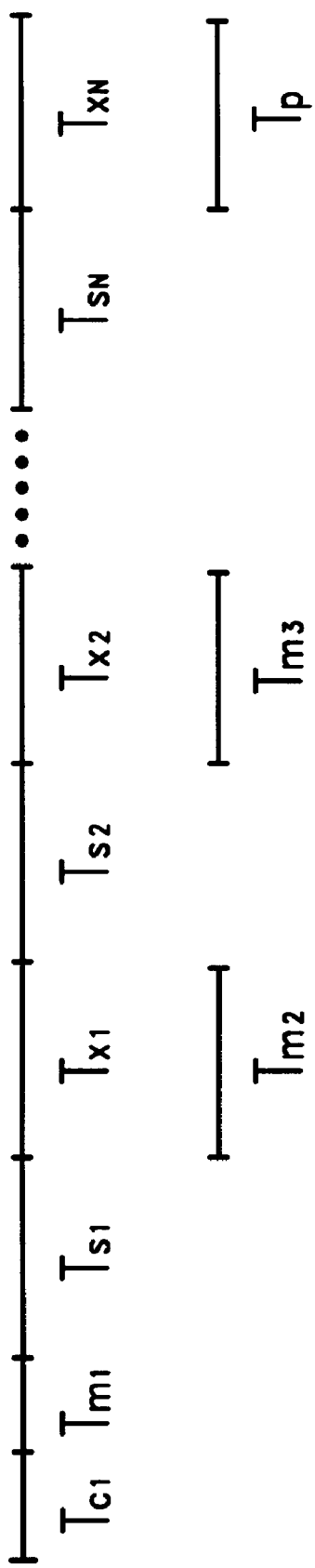
FIG. 5C shows a timing diagram for the present invention.

FIG. 5A to 5C illustrate how the present invention speeds up the image processing through a timing comparison among the conventional single scanning method, the conventional multiple scanning method and the present batch scanning method.

Figure 1:
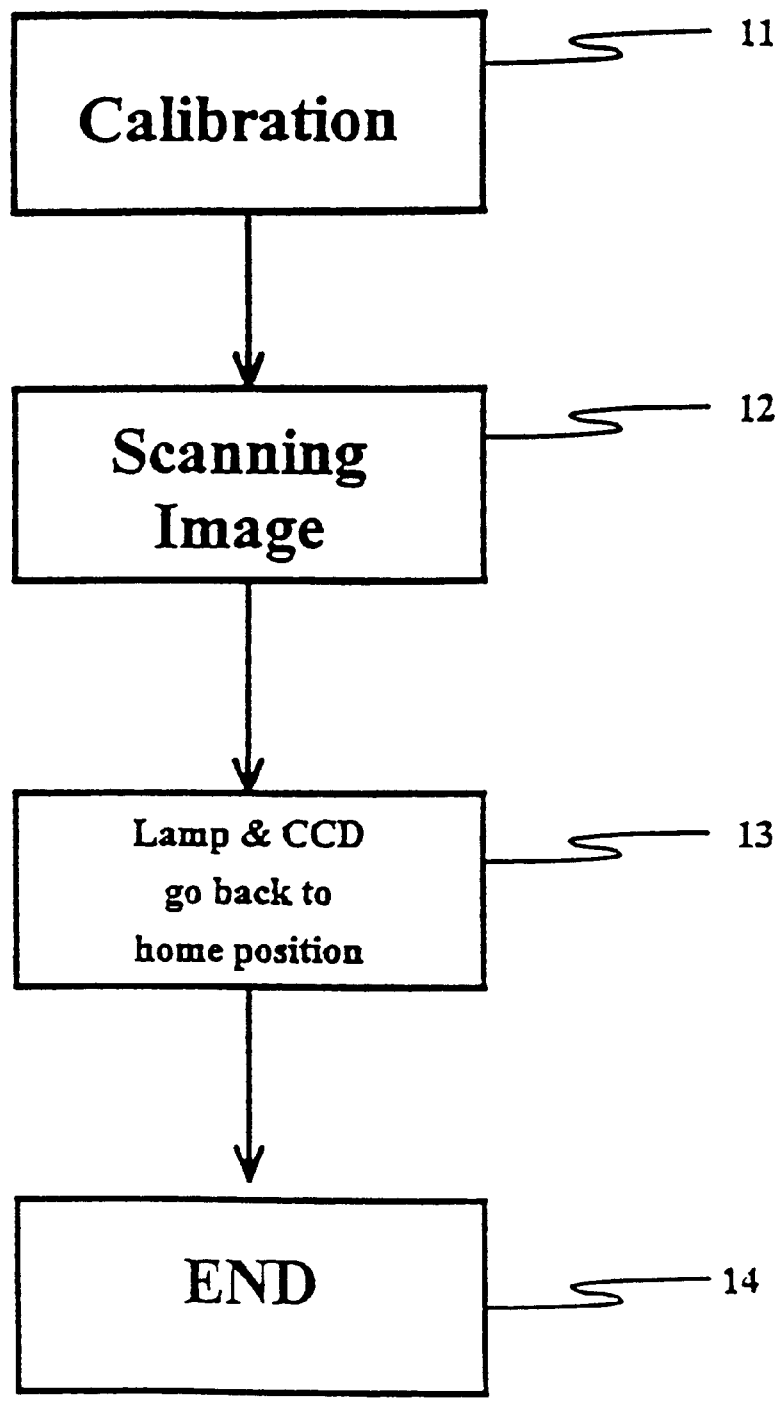
FIG. 1 illustrates the flow of a conventional single scanning method.

FIG. 5A shows a timing diagram of the conventional single scanning method, in which only one image is processed. In conjunction with the flow diagram in FIG. 1, time Tc is firstly required to calibrate the image system, and thereafter the lamp and the charge-coupled device take Tm seconds to be moved from the home position to the topmost position of the image. Duration of Ts seconds is then required to scan the whole single image. Finally, the data of the scanned image are transmitted back to a data processing machine such as a computer in Tx seconds. While the data transmission is proceeding, the lamp and the charge-coupled device are driven to the home position spending Tp seconds. The total time required for accomplishing a single scan is:

$$Tc+Tm+Ts+\max(Tx,Tp)$$

where operation max(Tx,Tp) chooses Tx or Tp, whichever is larger.

Figure 2A:
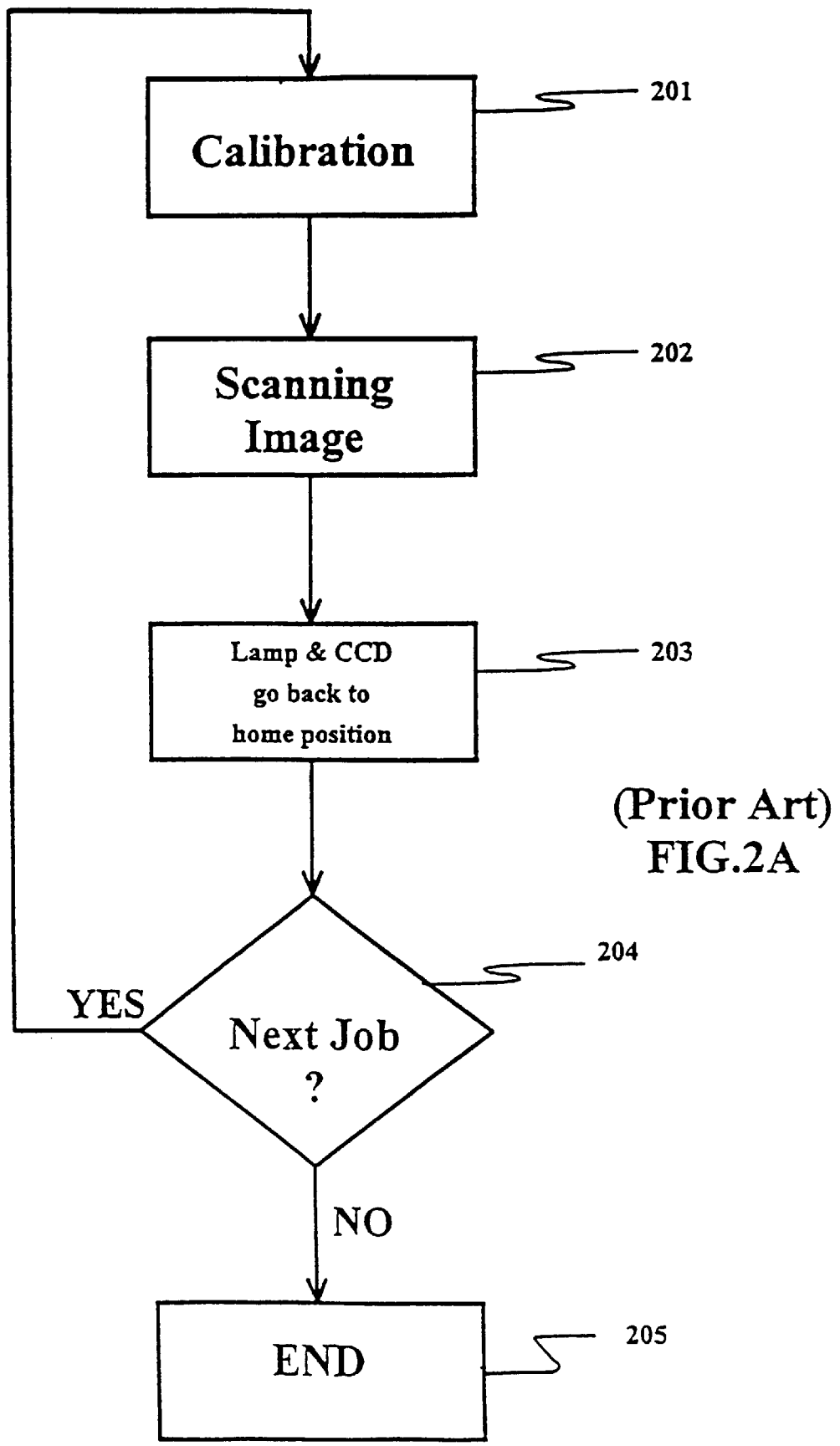
FIG. 2A illustrates the flow of a conventional multiple scanning method.
Figure 2B:
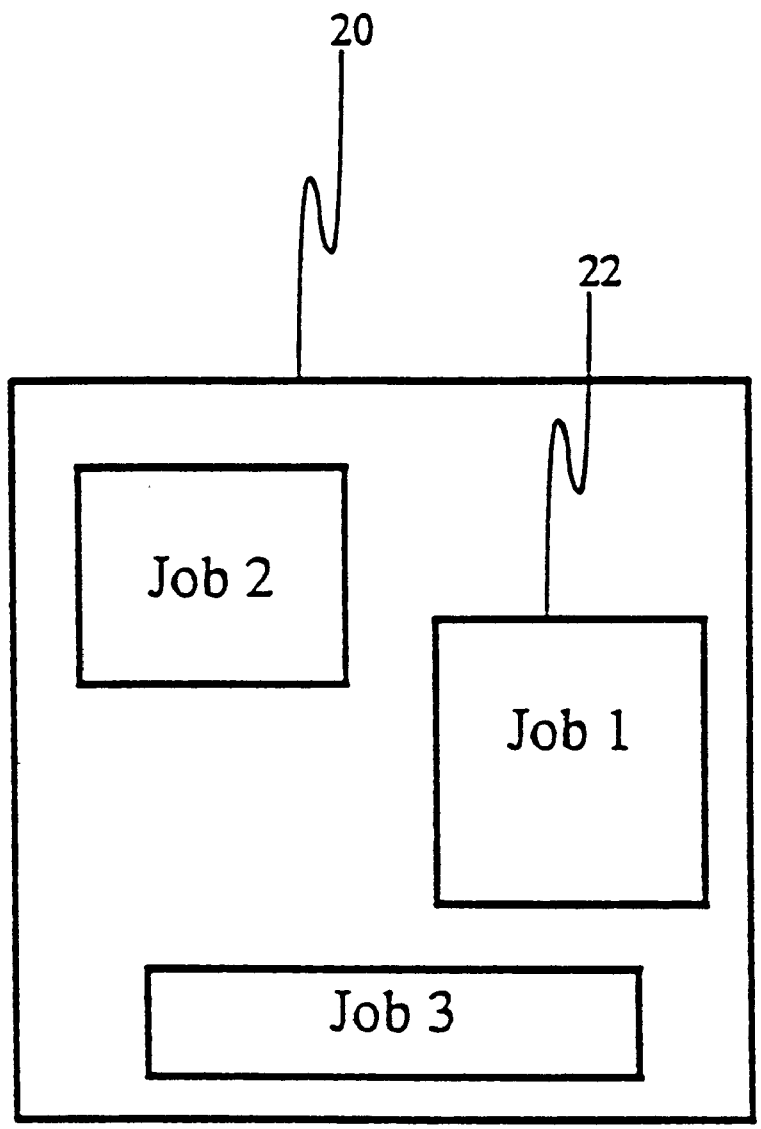
FIG. 2B shows an example of scanning three image sub-areas in the prior art.

FIG. 5B shows a timing diagram of the conventional multiple scanning method in conjunction with the flow diagram in FIG. 2A. For nth job to be scanned, time Tcn is needed to calibrate the image system, and thereafter the lamp and the charge-coupled device take Tmn seconds to be moved from the home position to the topmost position of the nth job. Duration of Tsn seconds is then required to scan the nth job. After the nth job is scanned, Txn seconds are required to send data back, and at the same time, Tpn seconds are needed to move the lamp and the charge-coupled device back to the home position. The total time required for accomplishing one scan cycle of N jobs is:

$$\sum_{n=1}^{N} Tcn + \sum_{n=1}^{N} Tmn + \sum_{n=1}^{N} Tsn + \sum_{n=1}^{N} \max(Txn, Tpn)$$

where operation max(Tmn,Tpn) chooses Txn or Tpn, whichever is larger.

Referring to a timing diagram of the present invention (FIG. 5C) in conjunction with the flow diagram in FIG. 4. Firstly, time Tc is needed to calibrate the image system, and thereafter the lamp and the charge-coupled device take Tm1 seconds to be moved from the home position to the topmost position of the first image job. Time Ts1 is then required to scan the job 1. After the job 1 is scanned, Tm2 seconds are needed to move the lamp and the charge-coupled device from the bottom position of the job 1 to the topmost position of the job 2, while the data of job 1 is transmitting back in Tx1 seconds. In general notation, Tsn is the time for scanning the nth job, Txn is the time for transmitting the data of the nth job, and Tmn is the time for moving the lamp and the charge-coupled device from the bottom position of (n−1)th job to the top position of the nth job. For the final job N, the lamp and the charge-coupled device is moved from the bottom of the Nth job to the home position in Tp seconds. The total time required for accomplishing one scan cycle of N jobs is:

$$Tc + Tm1 + \sum_{n=1}^{N-1} Tsn + \sum_{n=1}^{N-1} \max(Txn, T_{m(n+1)}) + T_{SN} + \max(T_{XN}, Tp)$$

where operations $\max(Txn, T_{m(n+1)})$ chooses Txn or $T_{m(n+1)}$, whichever is larger, and $\max(T_{XN}, Tp)$ chooses $T_{XN}$ or Tp, whichever is larger. Comparing to the expression of the total time for FIG. 5B, $$\left(\sum_{n=2}^{N} Tcn + \sum_{n=2}^{N} Tmn\right)$$

of the total time required in FIG. 5B is saved using the batch scanning method. Furthermore, the time Tmn for moving the lamp and the charge-coupled device to the next job in FIG. 5C is always less than or equal to Tpn, that is, the time required to move the lamp and the charge-coupled device back to the home position after the nth job is scanned in FIG. 5B.

Although specific embodiment has been illustrated and described, it will be obvious to those skilled in the art that various modifications may be made without departing from the spirit which is intended to be limited solely by the appended claims. For example, the order of sorting is not limited to the ascending way mentioned above, and the method is not limited to the aforementioned quick sorting. Furthermore, some steps in the present invention can be altered without departing from the spirit of the invention. For example, setting step 403 (FIG. 4) can be skipped until before scanning step 406, resulting in the same purpose of the present invention.

What is claimed is:

1. A batch scanning method for an image input system, comprising:

sorting a plurality of image areas according to top positions of said image areas;

setting a calibration mode;

setting top, bottom, left and right positions of the present image area, and the top position of the next higher image area;

calibrating the image input system when the present image area is the highest image area of the sorted areas;

scanning the present image area;

moving a light source and a photodetector directly to the top position of said next higher image area when at least one image area has not been scanned, wherein said photodetector moves backwards and directly to the top position of said next higher image area when the top position of said next higher image area is located higher than the bottom position of the present image area, and wherein said photodetector moves forwards and directly to the top position of said next higher image area when the top position of said next higher image area is located lower than the bottom position of the present image area; and repeating the position setting step, the scanning step and the moving step until the lowest image area has been scanned.

2. The method according to claim 1, wherein said calibration mode comprises color calibration mode, gray calibration mode and lineart (or bi-level black and white) calibration mode.

3. The method according to claim 2, wherein said color mode has highest priority and said lineart mode has lowest priority in setting the calibration mode.

4. The method according to claim 1, further comprising setting resolution, setting gamma, setting highlight, or setting shadow.

5. The method according to claim 1, wherein said light source is a lamp.

6. The method according to claim 1, wherein said photodetector is composed of at least one charge-coupled device.

7. The method according to claim 1, after scanning all said image areas, further comprising moving the light source and the photodetector to the home position of the image input system.

8. A batch scanning method for an image input system, comprising:

sorting a plurality of image areas according to top positions of said image areas;

setting a calibration mode;

calibrating the image input system when the present image area is the highest image area of the sorted areas;

setting top, bottom, left and right positions of the present image area, and the top position of the next higher image area;

scanning the present image area;

moving a light source and a photodetector directly to the top position of said next higher image area when at least one image area has not been scanned, wherein said photodetector moves backwards and directly to the top position of said next higher image area when the top position of said next higher image area is located higher than the bottom position of the present image area, and wherein said photodetector moves forwards and directly to the top position of said next higher image area when the top position of said next higher image area is located lower than the bottom position of the present image area; and repeating the position setting step, the scanning step and the moving step until the lowest image area has been scanned.

9. The method according to claim 8, wherein said calibration mode comprises color calibration mode, gray calibration mode and lineart (or bi-level black and white) calibration mode.

10. The method according to claim 9, wherein said color mode has highest priority and said lineart mode has lowest priority in setting the calibration mode.

11. The method according to claim 8, further comprising setting resolution, setting gamma, setting highlight, or setting shadow.

12. The method according to claim 8, wherein said light source is a lamp.

13. The method according to claim 8, wherein said photodetector is composed of at least one charge-coupled device.

14. The method according to claim 8, after scanning all said image areas, further comprising moving the light source and the photodetector to the home position of the image input system.

15. A batch scanning method for an image input system, comprising:

sorting a plurality of image areas according to top positions of said image areas;

setting a calibration mode, wherein said calibration mode comprises color calibration mode, gray calibration mode and lineart (or bi-level black and white) calibration mode, said color mode having highest priority and said lineart mode having lowest priority;

setting top, bottom, left and right positions of the present image area, and the top position of the next higher image area;

calibrating the image input system when the present image area is the highest image area of the sorted areas;

scanning the present image area;

moving a light source and a photodetector directly to the top position of said next higher image area when at least one image area has not been scanned, wherein said photodetector moves backwards and directly to the top position of said next higher image area when the top position of said next higher image area is located higher than the bottom position of the present image area, and wherein said photodetector moves forwards and directly to the top position of said next higher image area when the top position of said next higher image area is located lower than the bottom position of the present image area; and repeating the position setting step, the scanning step and the moving step until the lowest image area has been scanned.

16. The method according to claim 15, further comprising setting resolution, setting gamma, setting highlight, or setting shadow.

17. The method according to claim 15, wherein said light source is a lamp.

18. The method according to claim 15, wherein said photodetector is composed of at least one charge-coupled device.

19. The method according to claim 15, after scanning all said image areas, further comprising moving the light source and the photodetector to the home position.

20. A batch scanning method for an image input system, comprising:

sorting a plurality of image areas according to top positions of said image areas;

setting a calibration mode, wherein said calibration mode comprises color calibration mode, gray calibration mode and lineart (or bi-level black and white) calibration mode, said color mode having highest priority and said lineart mode having lowest priority;

calibrating the image input system when the present image area is the highest image area of the sorted areas;

setting top, bottom, left and right positions of the present image area, and the top position of the next higher image area;

scanning the present image area;

moving a light source and a photodetector directly to the top position of said next higher image area when at least one image area has not been scanned, wherein said photodetector moves backwards and directly to the top position of said next higher image area when the top position of said next higher image area is located higher than the bottom position of the present image area, and wherein said photodetector moves forwards and directly to the top position of said next higher image area when the top position of said next higher image area is located lower than the bottom position of the present image area; and repeating the position setting step, the scanning step and the moving step until the lowest image area has been scanned.

21. The method according to claim 20, further comprising setting resolution, setting gamma, setting highlight, or setting shadow.

* * * * *